Patented Dec. 5, 1933

1,937,672

UNITED STATES PATENT OFFICE 1,937,672

METHOD OF ACCELERATING PROPIONIC FERMENTATION

James M. Sherman, Ithaca, N. Y., assignor to The Wilbur White Chemical Company, Owego, N. Y., a corporation of New York No Drawing. Application April 25, 1928
Serial No. 272,863

2 Claims. (Cl. 260—120)

This invention relates to processes for producing propionic acid or propionates from materials containing carbohydrates and/or salts of certain organic acids by the fermentation of the said materials using organisms of the type of *Bacterium acidi-propionici*, and more particularly resides in methods of increasing the intensity and rate of the propionic fermentation.

While it is, of course, well known that carbohydrate-containing materials and/or salts of organic acids,—such as, for example, molasses or other fermentable carbohydrates, or salts of lactic acid,—may be caused to undergo propionic fermentation by means of organisms of the type of *Bacterium acidi-propionici*, it is equally well known that such fermentations heretofore have not been reduced to commercial practice to any large extent. There appear to be two complementary explanations therefor, to wit: (1) The relatively slow growth of the individual cells and the limited accumulation (i. e., relatively low numerical strength) of the same attained in a normal growth cycle of a culture in a unit volume of suitable medium, and (2) the characteristic, peculiar to organisms of the type mentioned, of a relatively long period of "lag" of unproductive dormancy in the growth cycle of the organisms.

When a suitable sterile medium is inoculated with an old culture of the organisms, a definite growth cycle may be observed:

I. At the beginning, there is a period of lag or dormancy during which no reproduction takes place. During this period the old cells undergo a process of rejuvenation which prepares them for reproduction.

II. After the lag phase, the culture undergoes rapid growth during which the number of organisms approximately doubles at the end of each generation time. This period of the cycle is known as the logarithmic growth phase,—it is during this phase that the individual cell evidences the greatest fermentative activity.

III. Following the logarithmic growth phase, the number of organisms remains fairly constant, or increases slowly, for an additional period.

IV. Finally, a period is reached during which the death rate is more rapid than the rate of reproduction and the number of living cells constantly decreases.

The above growth cycle is not peculiar to any one type of fermentation organism; however, in most microbic fermentations the period of lag is so short and the growth or reproduction rate is so rapid as to make it unnecessary in practical applications to consider these phases of the life cycle. In the case of propionic fermentation, on the other hand, the lag phase of organisms of the type of *Bacterium acidi-propionici* is markedly long, and their reproduction rate is slow, hence, these phases are of particular concern since they probably account for the non-use of propionic fermentation in the industrial art.

Again, it is well known that, in microbic fermentations, the products thereof do not appear in significant quantities until after the organisms have undergone extensive reproduction and have attained approximately their maximum numbers. This is because the amount of fermentation product produced by the individual cell is so small that it can be measured chemically only after enormous numbers of organisms have been produced and their fermentation products have accumulated.

An object of the present invention, therefore, is to provide a procedure whereby the number of propionic fermentation organisms in a given amount of fermentative medium may be artificially increased over that obtainable by a normal fermentation.

Another object is to provide a method of increasing the intensity and speed of the propionic fermentation by maintaining the organisms in a state of physiological youth.

It has now been found that the great mass of cells necessary for rapid propionic fermentation may be obtained by propagating the organisms under such conditions as make possible the withdrawal of fermented medium and the addition of fresh medium, with the retention of a large proportion of the cells, during the fermentation opperation. The mass of retained cells serves as a mass inoculum for the succeeding charge of fermentable material (i. e., the medium), thus causing the fermentation to start quickly and proceed rapidly. As this process is continued or repeated, there is accumulated a mass of microbic cells which far exceeds in numbers that obtained when a culture of the same organisms goes through its normal growth cycle in an unchanged medium of the same composition. With increase of the mass of cells there is a corresponding increase in the rate of fermentation.

This invention, then, is based upon the conception of artificially increasing the mass of propionic organisms beyond that spontaneously developed in a given body of medium, fermenting suitable medium in contact with this increased mass of cells, separating at least the major portion of the mass from the fermented medium and fermenting a fresh charge of medium with the separated mass of cells.

This method may be effected by any one of several procedures. Thus, for example, I have found that one operative procedure consists in carrying out the fermentation in a chamber or container in which a finely divided or porous inert substance,—such as limestone, sand, cinders, charcoal, or the like,—is suspended, or in which the said substance covers the bottom. This finely divided or porous substance furnishes surfaces on which the bacteria grow and to which they tend to adhere when the fermented liquid is removed. Another operable procedure consists in carrying out the fermentation in a tower, column or bed composed of, or in which are interposed a plurality of beds of, finely divided or porous inert substances on the surface of which the cells grow. The fermentable medium may be led through the tower, column or bed, and into and out of contact with the bacteria-encrusted substances filling the same, with minimum loss of cells.

Furthermore, a filter may be interposed between the mass of cells and the outlet of the fermentation chamber or container, for the purpose of retaining all or part of the cells when fermented liquid is withdrawn. Substantially the same effect may be produced by absorbing the organisms and their enzymes in a suitable solid adsorbent, such as, the material known as "Filter-Cel", or other argillaceous or diatomaceous material, and bringing about the fermentation of fermentable medium in contact therewith.

I have found, further, that the intensity and speed of the propionic fermentation may be increased by effecting the removal of fermented medium and introduction of fresh charge of fermentable medium during that period of the growth cycle of the propionic organisms hereinbefore referred to as "the phase of logarithmic growth". That is to say, I coordinate with the feature of effecting the fermentation in the presence of an artificially increased mass of cells the feature consisting in withdrawing fermented medium and introducing fresh medium during the period in which the organisms are in a state of physiological "youth". When this procedure is followed, no "lag" occurs, and the organisms continue their rapid reproduction in the fresh medium without any substantial interruption. Consequently, it is possible to maintain the organisms in a state of constant physiological youth, and thus still further increase the fermenting capacity of the artificially increased mass of cells.

The invention will be more specifically described by recourse to the following specific examples, it being understood that the invention is not restricted to the particular means, materials, procedures or conditions therein set out.

*Example 1.*—Into an open or closed vessel there is introduced 1 part by weight of a fermentable medium consisting of a 10 percent solution of molasses in water (i. e., equivalent to an aqueous solution of sugar of about 5 percent strength) and containing 1 percent, more or less, by weight of meat scrap. There are then added, in any order, infusorial earth in such amount that the earth occupies about ⅓ to ½ of the volume of the contents of the vessel, and calcium carbonate in amount at least equal to ½ the weight of the carbohydrate content of the medium. The mixture is then sterilized and there is then added a culture comprising *Bacterium acidi-propionici* and *Lacto-bacillus casei*.

Fermentation is allowed to proceed at a temperature of from about 30° to 35° C. for about 4 days, preferably, intermittent mild agitation is carried out during the first 3 days with settling of the solids during the 4th day. The supernatant liquid is then withdrawn and is replaced by an equivalent amount of fresh sterile medium.

The above cycle is repeated, the fermentation becoming more vigorous with each successive repetition until the maximum yield of propionic and acetic acids is attained. This point is reached usually at about the 4th repetition of the cycle. The cyclic procedure may be continued indefinitely, fermented liquid being withdrawn and a fresh charge of fermentable medium being added about every 4 days.

Under the conditions described, it has been established that a 3 percent yield or better can be obtained in from 2 to 4 days. That is to say, the fermented liquid is found to contain about 3 percent or more of propionic and acetic acids usually in about the proportion of 2 parts of propionic acid to 1 part of acetic acid.

It is to be understood that, in the above procedure, I may substitute for the molasses an equivalent amount of a sugar or of any other fermentable carbohydrate material, and for the meat scrap I may substitute any suitable organic source of nitrogen such as protein materials generally, dried yeast, blood meal, or the like.

It is also to be understood that while, under the conditions above set out, it now seems desirable to carry on the fermentation operation at a temperature of about 30° to 35° C., it is possible to effect the fermentation under other temperature conditions. Thus, it has been found possible to effect the fermentation at temperatures from as low as 15° C. or somewhat lower, to about 40° C. or somewhat higher.

*Example 2.*—According to the procedure set out in Example 1, an aqueous solution of calcium lactate containing calcium lactate equivalent to 5 percent of lactic acid is fermented using as fermenting means a culture comprising *Bacterium-acidi propionici* and *Lactobacillus casei*.

In fermenting an aqueous solution of calcium lactate it is to be understood that the presence of lactic acid bacteria is not essential. Their presence, however, has been found to effect a desirable stimulation of the activity of the *Bacterium acidi-propionici*. Instead of *Lactobacillus casei*, there may be used other organisms evidencing a desirable stimulation of the activity of the propionic acid-producing organisms, as described in U. S. Patent No. 1,459,959.

As described in the Sherman et al. Patent No. 1,470,885, it appears to be economically desirable to first convert the carbohydrate content of carbohydrate containing materials undergoing propionic fermentation into lactates and to bring about the propionic fermentation of the resulting lactates.

I claim:
1. In processes for the production of propionic acid compounds from carbohydrates or other suitable fermentable media by the fermentative action of organisms of the type of *Bacterium acidi-propionici*, the steps which consist in propagating a mass of the organisms on the surfaces of finely divided particles of inert solid absorptive material whereby to provide for ready separation of the organisms and fermented medium, fermenting the medium in the presence of the said mass of organisms, withdrawing at least the major portion of the fermented medium from contact with the mass of organisms, and supplying fresh medium to the said mass during the fermentation operation, the withdrawal of fermented medium from and the supply of fermentable medium to the mass of organisms being effected during that period of the growth cycle of the organisms which follows the dormancy phase but precedes the period during which the death rate is more rapid than the reproduction rate, and before the fermentation has gone to completion.

2. In processes for the production of propionic acid compounds from carbohydrates or other suitable fermentable media by the fermentative action of organisms of the type of *Bacterium acidi-propionici*, the steps which consist in propagating a mass of the organisms on the surfaces of finely divided particles of inert solid material, fermenting the medium in the presence of the said mass, withdrawing at least the major portion of the resulting fermented medium, and bringing a fresh supply of medium into fermentative action with the said mass during the fermentation operation, the fermented medium being withdrawn from and the fresh medium being brought into contact with the mass of organisms during the period in which the organisms are undergoing the logarithmic growth phase, and before the fermentation has gone to completion.

JAMES M. SHERMAN.